United States Patent [19]

Murayama et al.

[11] Patent Number: 5,211,031

[45] Date of Patent: May 18, 1993

[54] SCROLL TYPE COMPRESSOR AND REFRIGERATION CYCLE USING THE SAME

[75] Inventors: Akira Murayama; Tadashi Fukuishi; Sigeaki Kuroda; Toshiaki Koyama, all of Shimizu; Tadao Ochiai, Fujieda; Toshio Hirai, Shimizu; Shintaro Sado, Shimizu; Yasushi Izunaga, Shimizu; Shouji Kikuchi, Shimizu; Fumio Yoshinaga, Shimizu, all of Japan

[73] Assignee: Hitachi, Ltd., Tokyo, Japan

[21] Appl. No.: 704,204

[22] Filed: May 22, 1991

[30] Foreign Application Priority Data

May 24, 1990 [JP] Japan .................. 2-134315

[51] Int. Cl.$^5$ .................. F25B 1/00; F25B 1/10; F04B 41/06
[52] U.S. Cl. .................. 62/498; 62/510; 417/3; 417/5; 417/7; 417/8; 417/410 R; 418/55.6; 418/58
[58] Field of Search .................. 62/498, 510; 417/3, 417/4, 5, 7, 8, 410; 418/55.6, 58, 60

[56] References Cited

U.S. PATENT DOCUMENTS

| | | | |
|---|---|---|---|
| 3,487,657 | 1/1970 | Teegarden | 417/3 X |
| 3,503,223 | 3/1970 | Parker | 62/510 |
| 4,086,072 | 4/1978 | Shaw | 62/510 X |
| 4,205,537 | 6/1980 | Dubberley | 62/510 |
| 4,277,955 | 7/1981 | Parker | 62/510 |
| 4,580,947 | 4/1986 | Shibata et al. | 417/8 |
| 4,818,198 | 4/1989 | Tamura et al. | 418/55.6 |
| 4,870,831 | 10/1989 | Kitamoto | 417/3 X |
| 4,946,361 | 8/1990 | De Blois et al. | 418/55.6 |
| 4,947,655 | 8/1990 | Shaw | 62/510 |
| 5,050,233 | 9/1991 | Hitosugi et al. | 62/510 X |

FOREIGN PATENT DOCUMENTS

| | | | |
|---|---|---|---|
| 2402844 | 5/1979 | France | 62/510 |
| 1-262386 | 10/1989 | Japan . | |
| 0067494 | 3/1990 | Japan | 418/58 |
| 0112689 | 4/1990 | Japan | 418/58 |
| 2-92090 | 7/1990 | Japan . | |
| 0173366 | 7/1990 | Japan | 417/8 |
| 0181092 | 7/1990 | Japan | 418/58 |
| 0272262 | 11/1990 | Japan | 62/510 |

Primary Examiner—Henry A. Bennet
Assistant Examiner—Christopher B. Kilner
Attorney, Agent, or Firm—Antonelli, Terry, Stout & Kraus

[57] ABSTRACT

A scroll type compressor having a pair of scroll type compression units which are encased in the same casing so as to make a common use of a lubricating oil reservoir provided in the casing, wherein the compression units have compression elements, drive shafts, driving motors and other components which are of the same constructions and specifications, and wherein each of the compression units are adapted to be driven selectively by commercial electrical power or through a frequency-variable inverter so as to operate at different speeds. Since both compression units can be made up from the same components such as the compression elements, loads in the production, service and administration, are greatly reduced contributing to a reduction in the labor and cost, while eliminating any mounting error. Various operation patterns are obtainable by selecting the combination of the direct commercial power and the power supplied through the inverters, so as to provide delicate control of refrigeration capacity over a wide range in accordance with the level of the load demand. Common use of the lubricating oil reservoir by both compression units eliminates necessity for specific measure for preserving oil levels equally for both compression units.

9 Claims, 7 Drawing Sheets

FIG. I

SCROLL TYPE COMPRESSOR AND REFRIGERATION CYCLE USING THE SAME

BACKGROUND OF THE INVENTION

1. Field of the Invention

The present invention relates to a scroll type compressor having a pair of scroll type compression units mounted in a single casing and also to a refrigeration cycle incorporating such a scroll type compressor.

2. Description of the Related Art

A refrigeration cycle has been proposed which includes a plurality of compressors encased in independent casings, with the compressors being selectively operated such that one, two or more of these compressors operate simultaneously to enable control of refrigeration power in accordance with a change in the refrigeration demand. It has also been proposed to use combinations of at least one compressor having a large compression power and at least one compressor having a small compression power, so as to enable a delicate control of the refrigeration power over a wider range. A promblem arises in the use of a plurality of compressors in various combinations with regard to sufficient lubrication of the compressors. This problem is serious particularly when the independent compressors have their own lubricating oil reservoirs in their casings. Namely, in such a case, lubricating oil tends to be shifted from one compressor to another compressor during running of the refrigeration cycle, so as to cause a shortage of oil in one compressor while the other is charged with excessive oil. Various specific measures have to be taken to maintain optimum oil levels in all the compressors for a long time.

In order to overcome this problem, it has been proposed to incorporate a plurality of compression units in a single casing having a lubricating oil reservoir which is common to all these compression units.

This type of compressor having a plurality of compression units having a common oil reservoir formed in a single casing, however, suffers from a disadvantage that alteration of the capacity of the compressor essentially requires alteration of constructions and specifications of the compression units encased in the single casing. Since different types of compression units are employed, as well as differing combinations of these compression units, enormous cost is incurred not only in the production and service but also in administration of the component parts.

SUMMARY OF THE INVENTION

Accordingly, an object of the present invention is to provide a scroll type compressor of the type having a plurality of compression units encased in a single or common casing, facilitates production, service and administration of component parts, while facilitating change of total capacity of the compressor, thus adapting the compressor to a variety of demands.

Another object of the present invention is to provide a refrigeration cycle incorporating such a scroll type compressor.

To this end, according to the present invention, there is provided a scroll type compressor having a pair of scroll type compression units which are encased in the same casing so as to provide a common lubricating oil reservoir in the casing, wherein the compression units have compression elements, drive shafts, driving motors and other components which are of the same constructions and specifications, and wherein each of the compression units are adapted to be selectively driven selectively by commercial electrical power or through a frequency-variable inverter so as to operate at different speeds.

In the scroll type compressor of the invention, a pair of compression units are encased in the same casing and are lubricated by a lubricating oil supplied from a common lubricating oil reservoir provided in the casing. Thus, equal lubricating conditions are preserved for both compression mechanisms without requiring any specific means. In addition, both compression units can be made up from the same components such as the compression elements, drive shafts, driving motors and so forth, because these components of both compression mechanisms are of the same constructions and specifications. This remarkably reduces loads in the production and administration, greatly contributing to a reduction in labor and cost, while reducing any mounting error which may occur when compression units of different specifications are used. For the same reason, errors are avoided in connecting the compressor to a refrigeration cycle or to electrical power supply. Furthermore, since each of the compression units can operate at various speeds either directly by commercial electrical power or through a frequency-variable inverter, the total capacity of the compressor can be widely varied by suitably selecting the combination of the operating speeds of both compression units.

DESCRIPTION OF THE PREFERRED EMBODIMENTS

Figure 1:
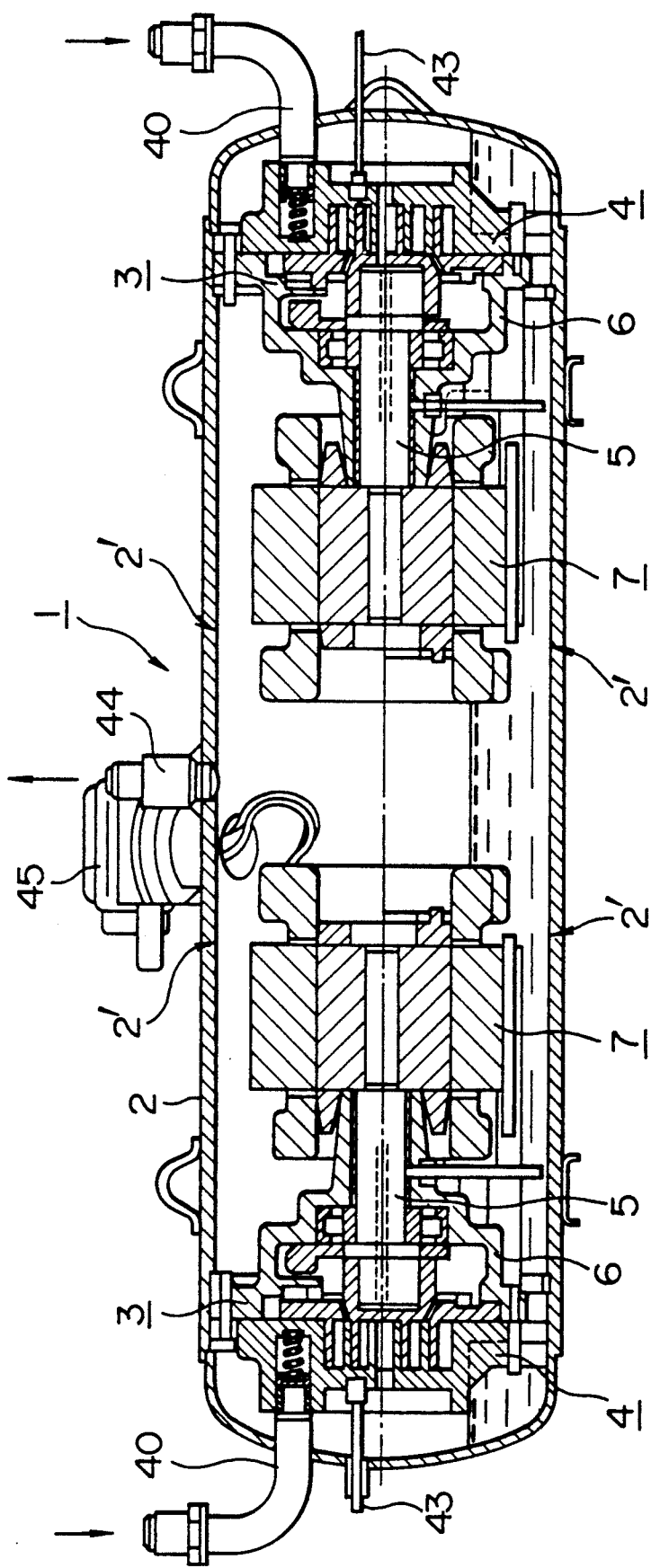
FIG. 1 is a sectional view of an embodiment of the scroll type compressor in accordance with the present invention.
Figure 2:
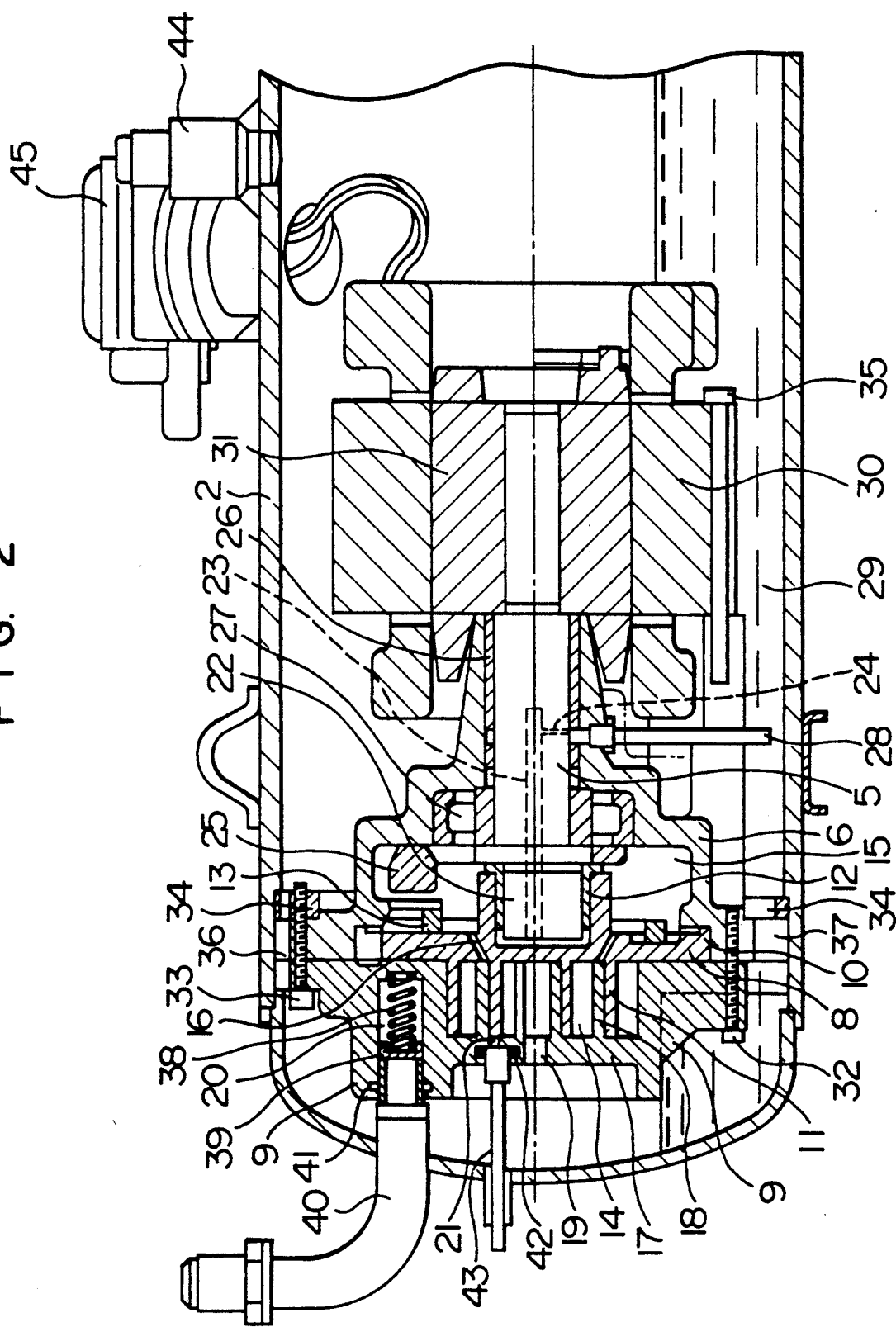
FIG. 2 is an enlarged sectional view of one of compression units incorporated in the compressor shown in FIG. 1.

Referring to FIGS. 1 and 2, the compressor 1 has a hermetic casing 2 encasing a pair of compression units 3 which are disposed horizontally and coaxially such that their driving motors are disposed in opposition to each other.

Each compression unit 3 has a scroll type compression element 4, drive shaft 5, a frame 6 supporting the drive shaft 5 and a driving electric motor 7.

One of the compression units 3 will be specifically described because both units have identical construction and specifications.

The scroll type compression element 4 includes a revolving scroll 8 and a stationary scroll 9. The revolving scroll 8 has a base plate 10 and a spiral wrap 11 protruding perpendicularly from the base plate 10. The base plate 10 is provided at its rear side with an revolving bearing 12. An Oldham's ring 13 for preventing the revolving scroll from rotating about its own axis is provided on the back side of the base plate 10 of the revolving scroll 9. A pressure equalizing port 16 is formed to penetrate the base plate 10 so as to provide a communication between a compression chamber 14 which is formed between the revolving scroll and the stationary scroll and a back-pressure chamber 15 which is formed on the back side of the revolving scroll 8. The back-pressure chamber 15 is defined by the base plate 10 of the revolving scroll and the frame 6.

The stationary scroll 9 has a base plate 17 and a spiral wrap 18 perpendicularly projecting from the base plate 17. The base plate 17 is provided at its center with a discharge port 19 and at its peripheral portion with a suction port 20. The base plate 17 is also provided with an injection port 21 through which liquid refrigerant is injected into the compression chamber 14.

The drive shaft 5 is supported by a frame 6 and is provided at its one end with an eccentric shaft 22. The drive shaft 5 also has a central bore which forms an oil supply bore 23 opening in the end surface of the eccentric shaft 22. The oil supply bore 23 opens in the peripheral surface of the shaft 5 through an oil suction hole 24. A balance weight 25 is attached to the drive shaft 5.

The frame 6 carries a motor-side bearing 26 and a scroll-side bearing 27 for supporting the drive shafts. The motor-side bearing 26 has a spiral groove formed in the inner surface thereof. The spiral groove functions as a viscosity pump for suctioning oil into the motor-side bearing 26. When the scroll-side bearing 27 is a roller bearing as in the illustrated case, a bearing serving as a seal is provided between the scroll-side bearing 27 and the motor-side bearing 26. The frame 6 is provided with an oil suction conduit 28 through which the oil in an oil reservoir 29 formed in the bottom of the hermetic casing 2 is suctioned to the oil suction hole 24 in the drive shaft 5.

The driving electric motor 7 is composed of a stator 30 and a rotor 31.

The revolving scroll 8 and the stationary scroll 9 are assembled together such that their wraps mesh each other. The stationary scroll 9 is fixed to the frame 6 by bolts 32. The stationary scroll and the frame, as a unit, are fastened to a seat 34 formed on the inner wall of the hermetic casing 2, by bolts 33 which penetrate the stationary scroll 9 and the frame 6.

The eccentric shaft 22 of the drive shaft 5 is received in the revolving bearing 12. The end of the drive shaft 5 opposite to the eccentric shaft 22 is connected to the rotor 31 of the electric motor 7. The stator 30 of the electric motor 7 is fastened to the frame 6 by means of bolts 35.

A groove, formed in upper region of the zone around the stationary scroll 9 and the frame 6, provides a gas passage 36 through which refrigerant gas, discharged from the discharge port 19, is introduced to the space around the electric motor, while a groove, formed in a lower region of the above-mentioned zone, provides an oil level balancing groove 37 which serves to equalize the oil levels in the sections of the oil reservoir 29 which are adjacent to the stationary scroll 9 and to the electric motor 7. Grooves corresponding to the gas passage 36 and the balancing groove 37 are formed in the seat 34.

A spring 38 and a valve 39 are mounted in the suction port 20 in the stationary scroll 9. A suction pipe 40, penetrating the wall of the hermetic casing 2, is fitted into the suction port 20 through a seal ring 41. The end of the suction pipe 40 provides a valve seat on which the valve 39 is seated and pressed by the force of the spring 38, thus forming a check valve.

Figure 3:
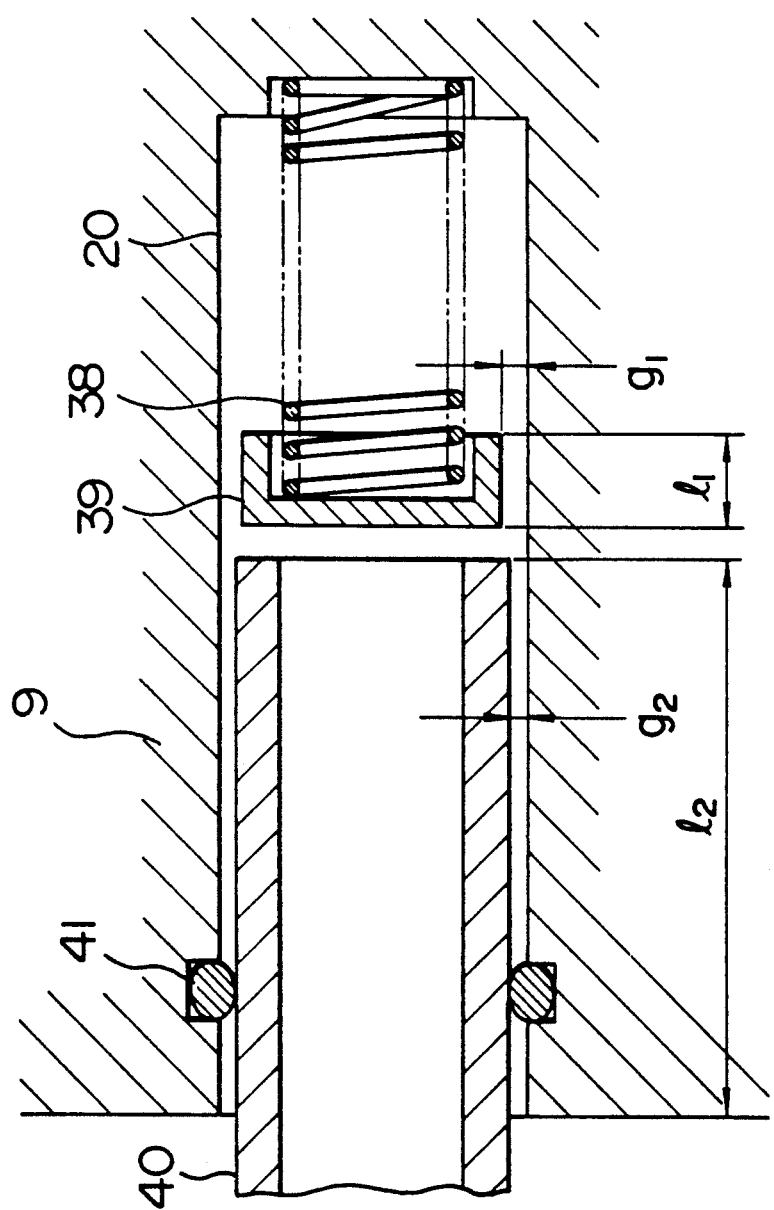
FIG. 3 is a schematic enlarged sectional view of the compression unit shown in FIG. 2, showing particularly an arrangement around a suction port.

From a practical point of view, it is difficult to fit the suction pipe 40 in the suction port 20 of the stationary scroll 9 in a completely coaxial manner. In many cases, therefore, the suction pipe 40 is slightly inclined with respect to the axis of the suction port 20. In this embodiment, therefore, a specific design consideration is given to enable the valve 39 to incline within the suction port 20 by an angle greater than the angle of inclination of the suction pipe 40. More specifically, referring to FIG. 3, the gap $g_1$ between the suction port 20 and the valve 39, axial length $l_1$ of the valve 39, the gap $g_2$ between the suction port 20 and the suction pipe 40 and the length $l_2$ of the suction pipe 40 inside the suction port 20 are determined to meet the following condition:

$$g_1/l_1 > g_2/l_2$$

According to this arrangement, any slight inclination of the valve seat presented by the end surface of the suction pipe 40, caused by a slight inclination of the suction pipe 40 with respect to the axis of the suction port 20, can be well followed by inclination of the valve 39, so that the valve 30 can be seated on the valve seat in close contact therewith, thus providing a reliable checking function.

An injection pipe 43, penetrating the wall of the hermetic casing 2, is inserted into the injection port 21 through a seal ring 42 placed therebetween.

A discharge hole 44 and a power supply connection terminal base 45 for electrical connection to the respective electric motors are provided on the central barrel portion of the hermetic casing 2.

A rotation of the electric motor 7 causes a revolving motion of the revolving scroll 8 with respect to the stationary revolving scroll 9, due to the eccentric rotation of the eccentric shaft 22 of the drive shaft 5. The Oldham's ring 13 prevents the revolving scroll 8 from rotating about its own axis. This causes a compression chamber, formed between both scrolls, to be progressively moved towards the center while reducing its volume, so that refrigerant gas, suctioned through the suction pipe 40 via the suction port 20, is compressed and discharged from the discharge port 19. The discharged compressed refrigerant gas is introduced to the region around the electric motor through the gas passage 36 so as to cool the electric motor and is then delivered to the outside of the compressor through the discharge hole 44. During the operation of the compressor, the pressure of the refrigerant gas in the compression chamber 14 in its compression phase is introduced through the pressure equalizing port 16 into the back pressure chamber 15 so as to press the revolving scroll 8 onto the stationary scroll 9 with a moderate force.

When the operation of the compression unit is suspended, the valve 39 is pressed onto the valve seat on the end surface of the suction pipe 40 by the force of the spring 38, so as to prevent a reverse gas flow from the high-pressure side to the low-pressure side.

When the temperature of the discharged compressed gas becomes excessively high during the operation of the compression unit, refrigerant in liquid phase is injected from the injection pipe 43 into the compression chamber 14. Injection of the liquid refrigerant into the compression chamber is not conducted when the compression unit is stopped, since the pressure in the compression chamber is instantaneously elevated to the level of the discharge pressure when the operation of the compression unit is stopped.

The oil in the oil reservoir 29 formed in the bottom of the hermetic casing 2 is suction through the oil suctioned pipe 28, oil suctioned hole 24 and then through the oil supply bore 23 by the pressure differential between the interior of the hermetic casing 2 and the back pressure chamber 15, so as to be supplied to the scroll-side bearing 27 and the revolving bearing 12. The oil is then discharged into the back-pressure chamber 15. Meanwhile, part of the oil suctioned through the oil suction pipe 28 is supplied to the motor-side bearing 26 by a viscosity pump provided in the motor-side bearing 26.

The oil discharged into the back pressure chamber 15 is introduced through the pressure equalizing port 16 into the compression chamber 14 and is discharged together with the compressed gas through the discharge port 19. The oil is then separated from the compressed gas within the hermetic casing 2 and is returned to the oil reservoir 29.

In the described embodiment of the compressor, each of the compression units are adapted to be driven directly by commercial electric power or through an inverter. It is therefore possible to operate the compressor in one of the following three patterns, namely, a first pattern in which both compression units 3 are driven through inverters, a second pattern in which one of the compression units 3 is driven through the inverter while the other is driven directly by the commercial electric power, and a third pattern in which both compression units 3 are directly driven by the commercial electric power. The compression unit driven through the inverter can linearly change its speed in accordance with the frequency given by the inverter. Thus, the capacity of the compression unit is linearly changeable. In the second and third patterns and described above, one of the compression units driven by the commercial electric power may be controlled in an on-off manner. In the first pattern, one of the compression units may be on-off controlled. Thus, the capacity of the compressor of the described embodiment is variable over a wide range, without requiring compression units of different specifications.

Since two compression units are of the same constructions and specifications, there is no risk of mounting of these units in wrong manner. Furthermore, since only one type of compression unit is required, production efficiency is improved and troublesome work for administration of parts can be dispensed with.

Figure 4:
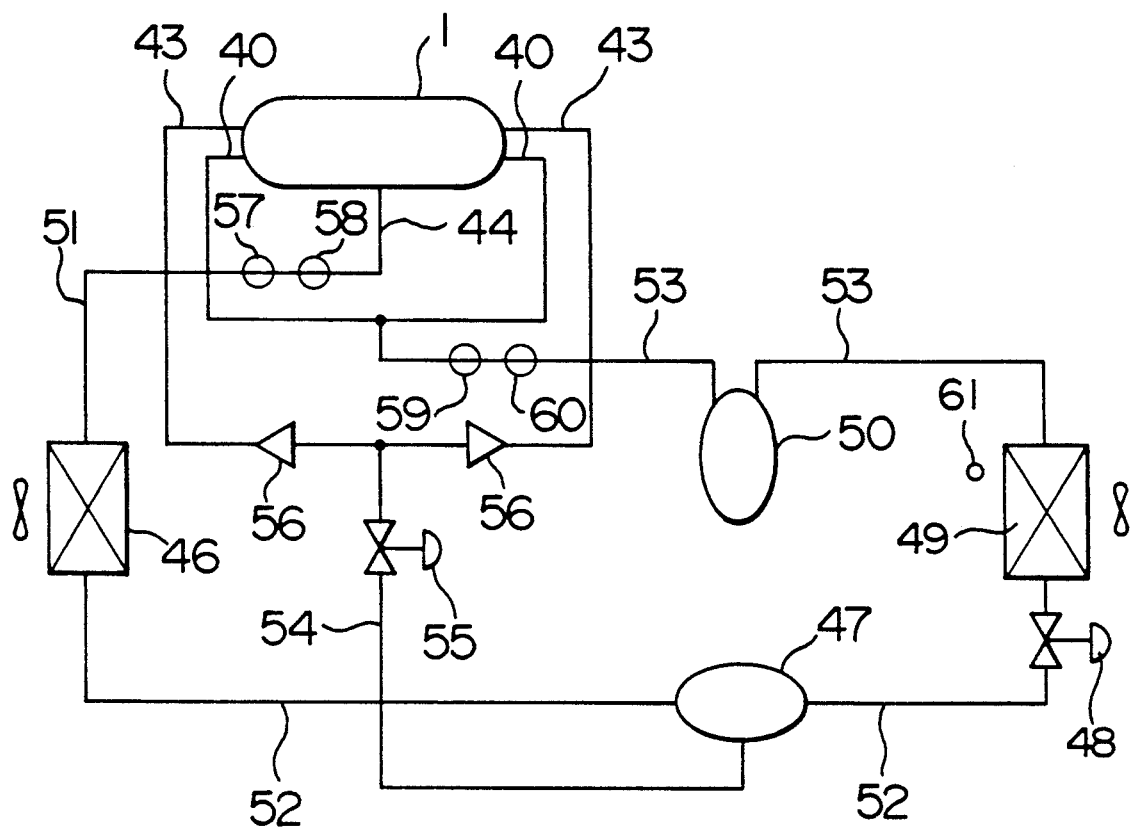
FIG. 4 is a diagram showing the construction of an embodiment of the refrigeration cycle of the present invention, using the compressor in accordance with the invention.

The refrigeration cycle shown in FIG. 4 has, in addition to the compressor 1, components such as a condenser 46, a thermal receiver 47, an expansion valve 48, an evaporator 49 and an accumulator 50 which are connected through a discharge pipe 51, liquid pipe 52 and a suction pipe 53. The injection pipe 43 of the compressor 1 is connected to the thermal receiver 47 through an injection line 54.

A discharge pressure sensor 57 and a discharge gas temperature sensor 58 are attached to the discharge pipe 51. Likewise, a suction pressure sensor 59 and a suction gas temperature sensor 60 are attached to the suction pipe 53. An air temperature sensor 61 for sensing temperature of air blown into a room is disposed in the vicinity of the evaporator 49. A stop valve 55 is provided in the injection line 54 branched into two pipes, with each pipe including a check valve 56. The stop valve 55 is controlled so as to open and close in accordance with a signal from the discharge gas temperature sensor 58. Although an on-off type valve such as a solenoid-actuated valve may be used as the stop valve 55, a better effect is obtained by using a valve which changes its opening degree in accordance with the temperature of the discharged gas sensed by the discharge gas temperature sensor 58.

Figure 5:
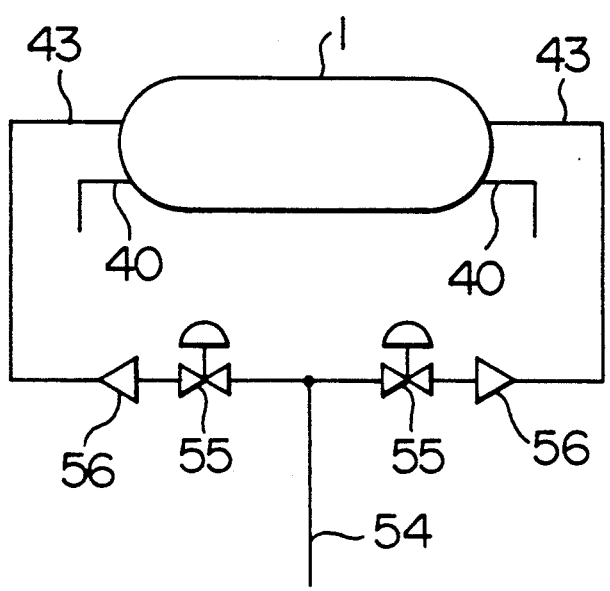
FIG. 5 is a diagram of a modification of injection piping portion of the refrigeration cycle shown in FIG. 4.

In the described embodiment of the compressor of the present invention, the interior of the hermetic casing 2 is maintained at the same pressure level as the discharge pressure, and the check valve 39 for preventing reverse flow of the compressed refrigerant gas during stopping of the compressor is provided in the suction side of the scroll compression element of each compression unit. In the described embodiment, therefore, only one stop valve 55, disposed in the common portion of the injection line 54, is used in order to prevent injection of liquid refrigerant into the compression units. However, when the compression mechanism is of the type in which the check valve for preventing reverse flow of the compressed gas is provided in the discharge side of the scroll type compression element of each compression unit, e.g., in the discharge port 19, it is preferred to provide a stop valve 55 in each branched injection line leading to each compression unit of the compressor as shown in FIG. 5, in order to prevent liquid refrigerant from coming into the compression unit which is not operating.

The refrigeration cycle shown in FIG. 4 is suitable for use in a refrigeration system or an air-conditioner exclusively used for cooling air.

Figure 6:
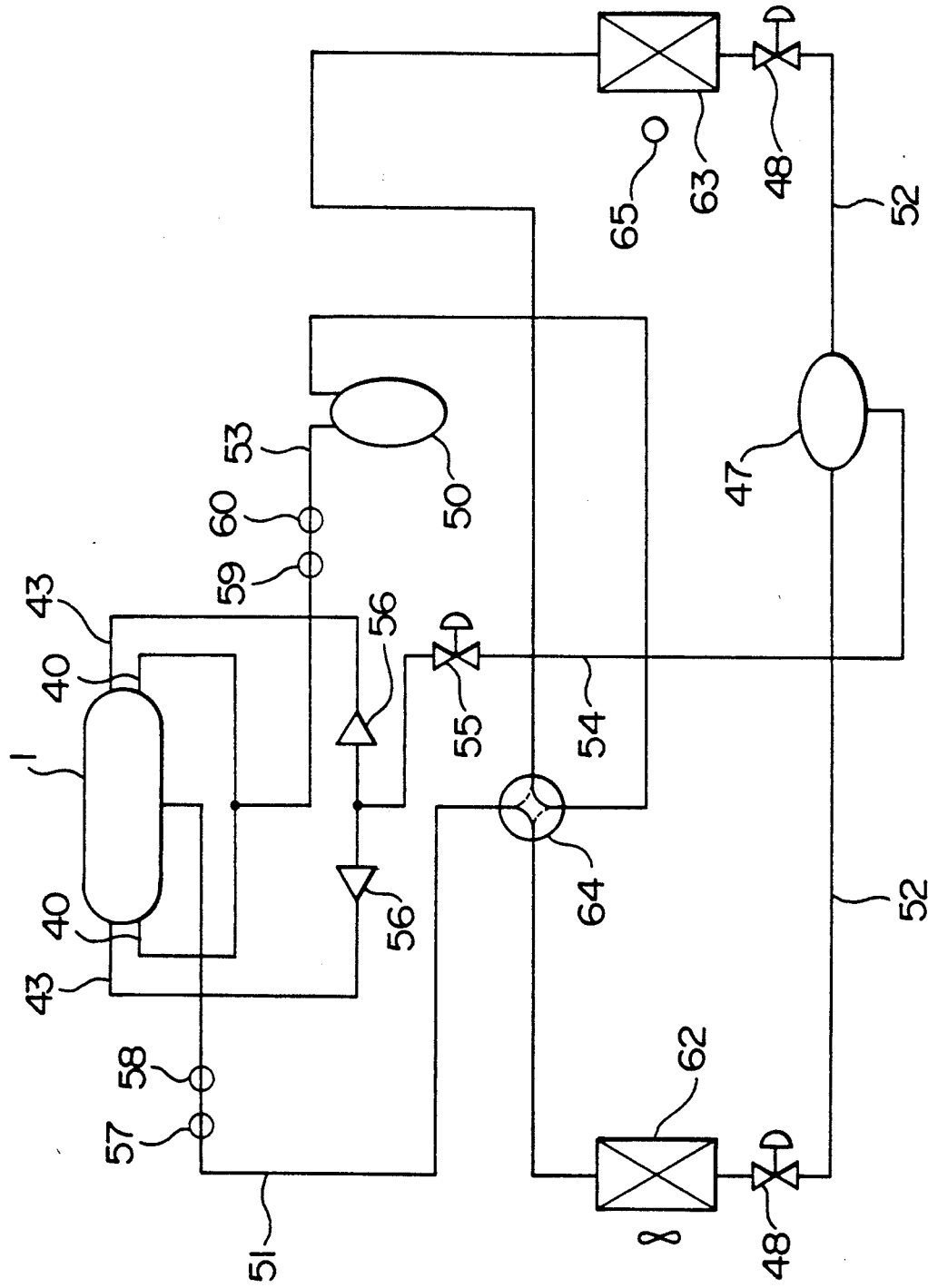
FIG. 6 is a diagram showing the construction of another embodiment of the refrigeration cycle of the present invention, using the compressor in accordance with the invention.

The refrigeration cycle shown in FIG. 6 differs from that shown in FIG. 4 in that the condenser 46 and the evaporator 47 are respectively substituted by an outdoor heat exchanger 62 and an indoor heat exchanger 63 each of which can operate both as a condenser and an evaporator, and a four-way valve 64 and associated piping are added to enable switching of path of flow of the refrigerant, thus forming a heat pump cycle which can operate either in a cooling mode or a heating mode.

A description will now be given of an embodiment of the invention in which the compressor of the invention is effectively used in the refrigeration cycle of the type shown in FIG. 4 or of the type shown in FIG. 6. The refrigeration cycle is not described because it is identical to that shown in FIG. 4 or 6.

Figure 7:
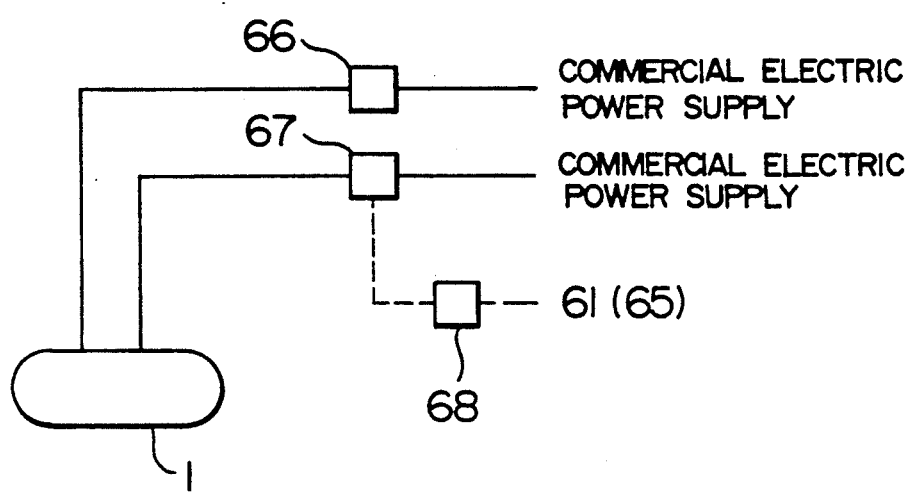
FIGS. 7 to 10 are power supply connection diagrams showing different patterns of use of the compressor of the present invention.
Figure 8:
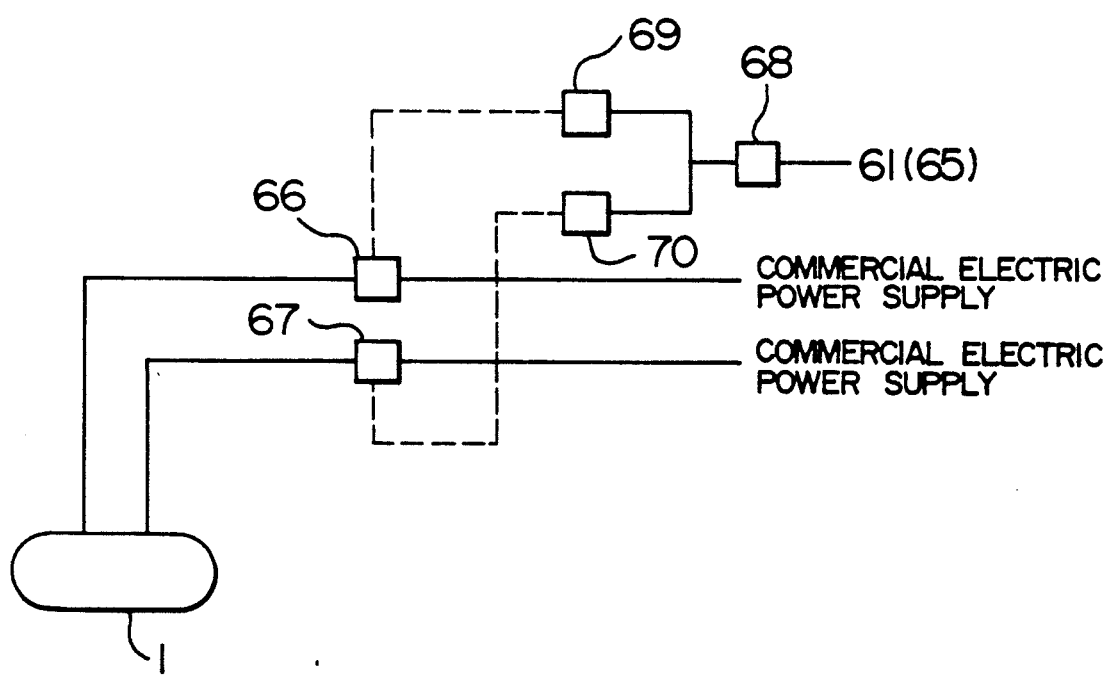

FIG. 7 shows the operation pattern in which both of two compression units of the compressor 1 are driven by commercial electric power. In this mode, the electric motors of both compression units are supplied with commercial electric power through relays 66, 67. One of the electric motors in-off controlled by a controller 68 in accordance with a signal from the temperature sensor 61 or 65. In this case, it is preferred that the on-off signal from the controller 68 is switched between the relays 69 and 70 so that both compression units are alternately put to the on-off control, whereby excessive burdening of one of the compression units is avoided.

Figure 9:
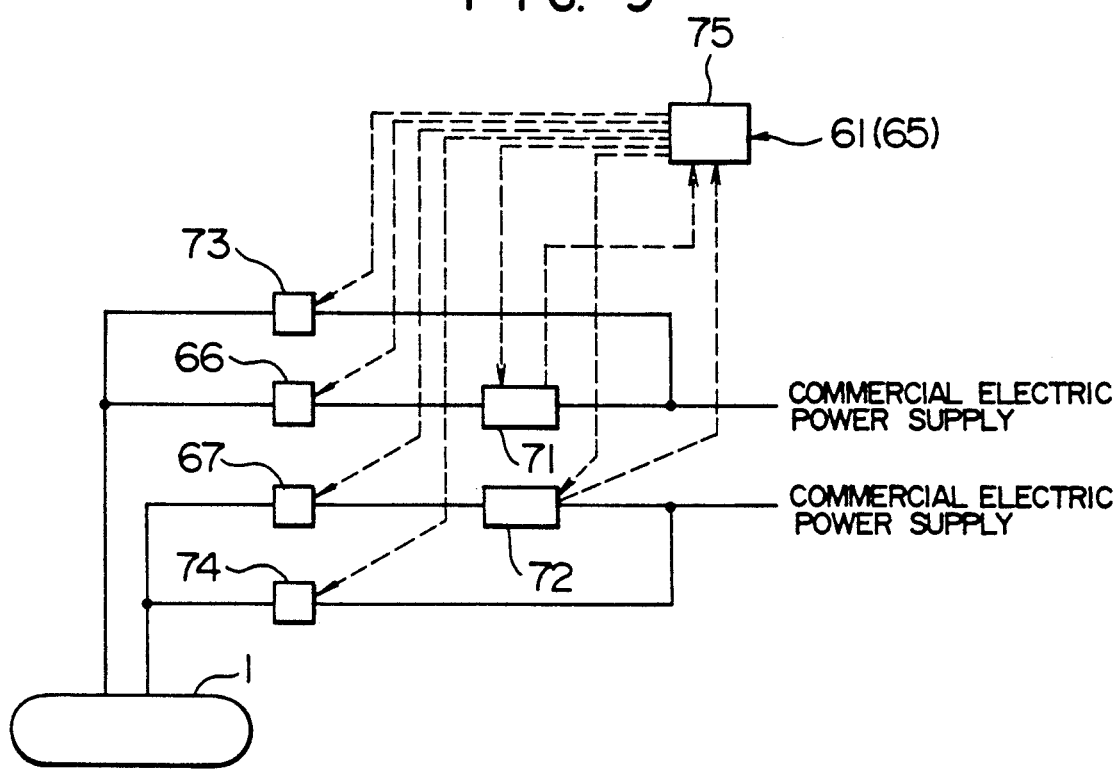

FIG. 9 shows the operation pattern in which both compression units are driven through inverters. In this case, the driving electric motors are supplied with electric power through inverters 71 and 72 which are controlled and turned on and off by a controller 75. On-off operation of either one of the compression units may also be adopted in this mode, depending on the capacity demand of the refrigeration cycle. In such a case, as in the pattern described before, the relays 66 and 67 are arranged switchably so as to enable that both compression units are alternatingly put to on-off operation, thus equalizing the total working hours of both compression units. It is also possible to provide circuits which directly connect the electric motors to the commercial power source and which are provided with relays 73, 74, so that both compression units can be operated by the commercial electric power in the event of a failure in the inverters.

Figure 10:
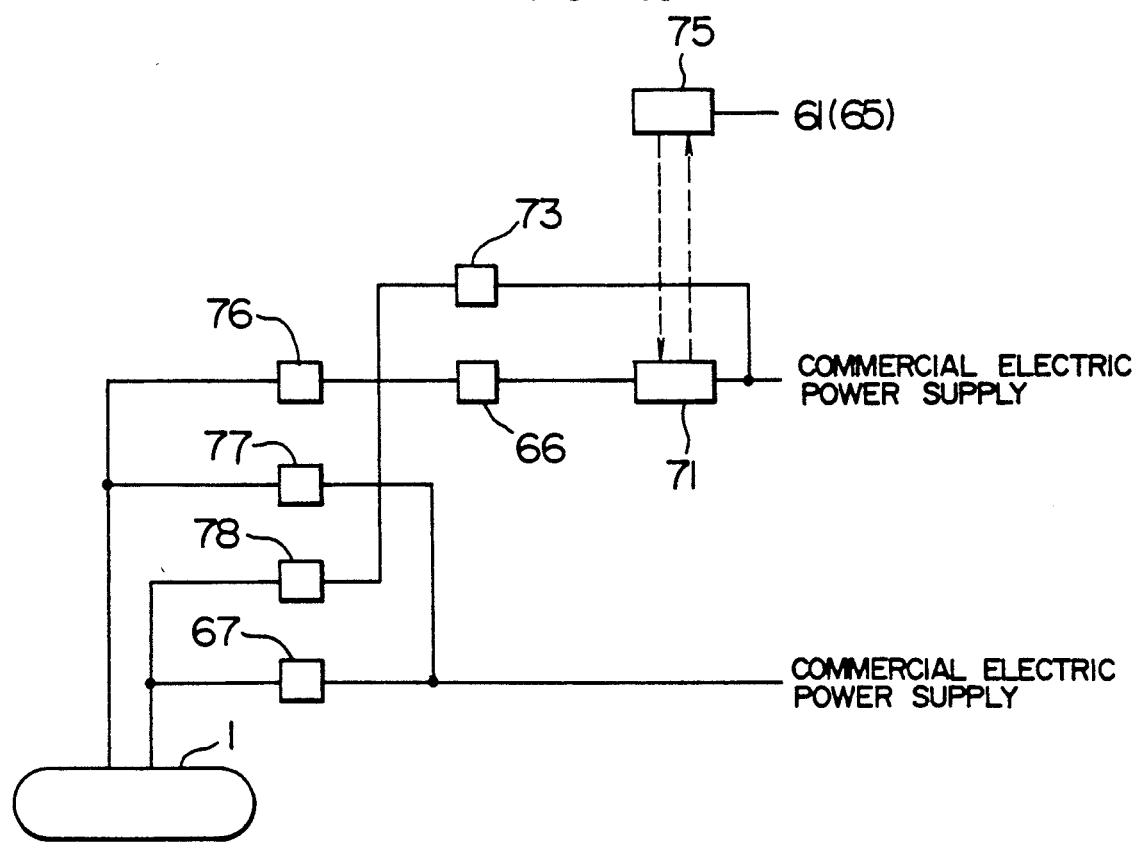

FIG. 10 shows the operation patterns in which one of the compression units is driven by the commercial electric power while the other is driven through the inverter. As illustrated, the inverter 71 is put into effect. The controller 75 controls the frequency of the inverter output power in accordance with the refrigeration load. If the total capacity of the compressor 1 is too large for the demanded refrigeration load even after lowering of the inverter output frequency to the minimum level, the electric motor directly connected to the commercial electric power supply is turned off. In this operation pattern, the compression unit operated through the inverter operates longer than the compression mechanism driven by the commercial electric power. It is therefore preferred that these compression units are replaced with each other at a suitable period.

In the event of a failure in the inverter, both compression units are driven by the commercial electric power through the inverter-bypassing circuits.

In the event that a problem develops in one of the compression units, the other compression unit is driven through the inverter or by the commercial electric power.

The above-described change-over of modes are attained without difficulty by selective operation of the relays 66, 67, 73, 76, 77 and 78 as shown in FIG. 10.

Obviously, according to the present invention, it is possible to drive one of the compression units through an inverter or directly by commercial electric power while the other is experiencing problems or possibly provide operation patterns in which both compression units are driven by the commercial power directly or through inverters.

Thus, according to the invention, each of two compression units can be driven directly by the commercial electric power or indirectly through inverter, so that the compressor can operate in any one of the aforesaid three operation patterns. This enables a delicate control of the capacity over a wide range, adapting to a variety of refrigeration demands.

As stated before, in the compressor of the invention having two compression units encased in a common casing so as to make a common use of an oil reservoir, one of the compression units may be stopped while the other is operating. In such a case, there is a risk that the refrigerant gas leaks from the compression unit which is stopped, causing various inconveniences on the operation of the refrigeration cycle. A risk also exists that oil undesirably fills the compression chamber of the compression unit which is not operating. In order to eliminate such risks, it is very important that the check valve 39 in the suction port 20 of each compression unit is closed without fail. Thus, the arrangement explained before in connection with FIG. 3, which ensures that the check valve 39 is seated on the valve seat in close contact therewith.

In the embodiment shown in FIG. 1, the hermetic casing 2 is formed by welding a pair of cup-shaped casing parts to the central barrel portion as at 2' and 2', and the discharge port 44 and the power supply connection terminal base 45 are provided on the central barrel portion. Thus, the advantage brought about by the use of the same design and specifications, explained before in connection with the compression units, is attained also with the case of production of the hermetic casing 2, thus contributing to a further improvement in the production efficiency and reduction in the cost.

As will be understood from the foregoing description, the present invention offers the following advantages.

Firstly, it is to be noted that production, service and parts administration are simplified and facilitated to reduce costs and, at the same time, erroneous mounting is avoided, by virtue of the fact that two compression units encased in the same compressor casing have the same construction and specifications.

Secondly, the compressor of the invention can cope with various refrigeration demands over a wide range since three operation patterns are available by virtue of the fact that each of the compression units can operate either directly by commercial electrical power or through an inverter.

Thirdly, since both compression units make a common use of an oil reservoir formed in the common casing, there is no need of specific consideration which has been hitherto necessary to maintain optimum lubricating oil levels in independent compressors.

What is claimed is:

1. A scroll type compressor comprising:
   a hermetic casing having a lubricating oil reservoir formed on a bottom portion thereof;
   a pair of compression units encased in said casing and having the same construction and specification, each of said compression units including a scroll type compression element composed of revolving and stationary scrolls each having a base plate and a spiral wrap perpendicularly protruding from said base plate, said scrolls being assembled together with their wraps meshing with each other, each of said compression units further including a drive shaft for driving said revolving scroll, a frame supporting said scroll type compression element and said drive shaft, and an electric motor for driving said drive shaft, said compression units being disposed horizontally in said casing coaxially with respect to each other, with the electric motors of the pair of compressor units being disposed in opposition to each other;
   means for supplying a lubricating oil to both compression units from said lubricating oil reservoir; and
   a discharge passage provided in each of the compression units for enabling a discharge of compressed refrigerant to an area around the electric motor so as to cool the electric motor prior to discharge from the compressor; and electric power supply for supplying electrical power to said electric motor of said compression units such that each of said electric motors is driven directly by commercial electric power or through a frequency-variable inverter for driving said motors at various speeds.

2. A refrigeration cycle comprising, at least:
a compressor;
a condenser;
a refrigerant expander;
an evaporator and a piping through which said compressor, condenser, refrigerant expander and said evaporator are connected to form a closed loop;
wherein said compressor is a scroll type compressor comprising:
a hermetic casing having a lubricating oil reservoir formed on a bottom portion thereof;
a pair of compression units encased in said casing and having the same construction and specification, each of said compression units including a scroll type compression element composed of revolving stationary scrolls each having a base plate and a spiral wrap perpendicularly protruding from said base plate, said scrolls being assembled together with their wraps meshing with each other, each of said compression units further including the drive shaft for driving said revolving scroll, a frame supporting said scroll type compression element and said drive shaft, and an electric motor for driving said drive shaft, said compression units being disposed horizontally in said casing coaxially with each other, with the electric motors of the pair of compression units being disposed in opposition to each other;
means for supplying a lubricating oil to both compression units from said lubricating oil reservoir;
a discharge passage provided in each of the compression units for enabling a discharge of compressed refrigerant to an area around the electric motor so as to cool the electric motor prior to discharge from the compressor; and
electric power supply for supplying electrical power to said motors of said compression units such that each of said electric motors is driven directly by commercial power or through a frequency-variable inverter for driving said motor at various speeds; and
wherein said refrigeration cycle further comprises a controller for controlling the supply of electrical power to enable both of said compression units to be driven at a constant speed by commercial electric power with one of said compression units turned on and off in accordance with the refrigeration capacity demanded by the refrigeration cycle.

3. A refrigeration cycle comprising, at least:
a compressor;
a condenser;
a refrigerant expander;
an evaporator and a piping through which said compressor, condenser, refrigerant expander and said evaporator are connected to form a closed loop;
wherein said compressor is a scroll type compressor comprising:
a hermetic casing having a lubricating oil reservoir formed on a bottom portion thereof;
a pair of compression units encased in said casing and having the same construction and specification, each of said compression units including a scroll type compression element composed of revolving and stationary scrolls each having a base plate and a spiral wrap perpendicularly protruding from said base plate, said scrolls being assembled together with their wraps meshing with each other, each of said compression units further including a drive shaft for driving said revolving scroll, a frame supporting said scroll type compression element and said drive shaft, and an electric motor for driving said drive shaft, said compression units being disposed horizontally in said casing coaxially with respect to each other, with the electric motors of the pair of compression units being disposed in opposition to each other;
means for supplying a lubricating oil to both compression units from said lubricating oil reservoir;
a discharge passage provided in each of the compression units for enabling a discharge of compressed refrigerant to an area around the electric motor so as to cool the electric motor prior to discharge from the compressor; and
electric power supply for supplying electric power to said motors of said compression units such that each of said electric motors is driven directly by commercial electric power or through a frequency-variable inverter for driving said motor at various speeds; and
wherein said refrigeration cycle further comprises a controller for controlling the supply of electric power to enable one of said compression units to be driven at a constant speed by the commercial electric power while the other is driven at various speeds through the inverter.

4. A refrigeration cycle according to claim 3, wherein said means turns said compression unit driven by the commercial electric power on and off in accordance with the level of the refrigeration capacity demanded by the refrigeration system.

5. A refrigeration cycle comprising, at least:
a compressor;
a condenser;
a refrigerant expander;
an evaporator and a piping through which said compressor, condenser, refrigerant expander and said evaporator are connected to form a closed loop;
wherein said compressor is a scroll type compressor comprising:
a hermetic casing having a lubricating oil reservoir formed on a bottom portion thereof;
a pair of compression units encased in said casing and having the same construction and specification, each of said compression units including a scroll type compression element composed of revolving and stationary scrolls each having a base plate and a spiral wrap perpendicularly protruding from said base plate, said scrolls being assembled together with their wraps meshing with each other, each of said compression units further including a drive shaft for driving said revolving scroll, a frame supporting said scroll type compression element and said drive shaft, and an electric motor for driving said drive shaft, said compression units being disposed horizontally in said casing coaxially with respect to each other, with the electric motors of the pair of compression units being disposed in opposition to each other;
means for supplying a lubricating oil to both compression units from said lubricating oil reservoir;

a discharge passage provided in each of said compression units for enabling a discharge of compressed refrigerant to an area around the electric motor so as to cool the electric motor prior to discharge from the compressor; and electric power supply for supplying electrical power to said motors of said compression units such that each of said electric motors is driven directly by commercial electric power or through a frequency-variable inverter for driving said motor at various speeds; and wherein said refrigeration cycle further comprises a controller for controlling the supply of electrical power to enable both of said compression units to be driven through the inverters at various speeds in accordance with the level of the refrigeration power demanded by the refrigeration cycle.

6. A refrigerating cycle according to claim 5, wherein said controller turns one of said compression units on and off in dependence upon the level of refrigeration power demanded by the refrigeration cycle.

7. A refrigeration cycle according to one of claims 2, 3, 4 or 6, wherein said controller replaces an operational status of said compression units with each other at a predetermined time interval to determine the condition of the respective compression units.

8. A refrigeration cycle according to one of claims 3, 4, 5 or 6, wherein, in the event of a failure in the inverter, said controller switches said compression unit which has been driven through the failed inverter so as to be driven directly by the commercial electric power.

9. A refrigeration cycle according to one of claims 2, 3, 4, or 6, wherein said controller solely drives the compression unit which has not failed in the event of a failure of one of said compression units.

* * * * *